INVENTORS
LEONARD R. VAN HORIK
RICHARD T. PFAFFENBERGER
By Robert O. Richardson
— ATTORNEY —

United States Patent Office 3,460,233
Patented Aug. 12, 1969

3,460,233
ROLL-WELD PROCESS FOR SHAPE FORMING
BODIES OF REVOLUTION
Richard T. Pfaffenberger, Manhattan Beach, and Leonard R. Van Horik, Long Beach, Calif., assignors, by mesne assignments, to McDonnell Douglas Corporation, Santa Monica, Calif., a corporation of Maryland
Filed Feb. 16, 1966, Ser. No. 529,605
Int. Cl. B21h *1/00*
U.S. Cl. 29—423       5 Claims

ABSTRACT OF THE DISCLOSURE

A method of fabricating ribbed reinforced domes, or cone shaped structures and other bodies of revolution of heat resistant materials having a high strength-to-weight ratio by heating and spin or shear forming.

In the making of gores (portions of the hemisphere), domes or cones using heat resistant materials having a high strength to weight ratio, current techniques call for the welding together of smaller pieces after they have been formed and after the reinforcing structures have been welded thereto. An alternative method of providing domes or cones when a ductile metal such as aluminum is used and wherein reinforcing ribs are later attached thereto is a process known as spin or shear forming. This is done by rotating a sheet of material over a form with a roller to progressively bend the metal into the cone or dome shape over the form.

The fabrication of such a dome or cone shaped configuration is possible in accordance with the present invention. Ribbed domes or cones of a temperature resistant material having a high strength to weight ratio, may be formed with the spin or shear forming process usually limited to the ductile metals without reinforcing ribs. This may be accomplished by the fabrication of a rolled-weld layer pack normally adapted for roll-weld bonding in a single plane and subjecting the pack to the desired heat and pressure for the spin forming operation. Thereafter the pack may be opened and the filler material between the ribs removed. In this manner it is possible to roll sandwich or rib stiffened domes or cones to exact requirements while eliminating the need of fabrication of sections for fitting and welding together.

It is therefore an object of this invention to provide for a novel roll-welded shape forming process for bodies of revolution.

It is another object to provide for a shape forming process for fabricating integrally ribbed or sandwich domes or cones without fusion welding, of temperature resistant high strength to weight materials.

Other objects will become more apparent as a description of this invention proceeds, having reference to the drawings, wherein.

A method for producing ribbed metal sandwich structures was invented by Robert I. Jaffee for which a Patent, No. 3,044,160 was issued on July 17, 1962. This patent describes the making of ribbed metal sandwich structures by placing ribs and filler bars between top and bottom face sheets within a pack, presenting a solid filled construction. The ribs and face sheets become welded together when subjected to suitable heat and pressure. After the structure has been roll-welded the pack was broken open, the top and bottom cover sheets and frame were removed and thereafter the filler material between the ribs was removed by mechanical or chemical means.

Figure 1:
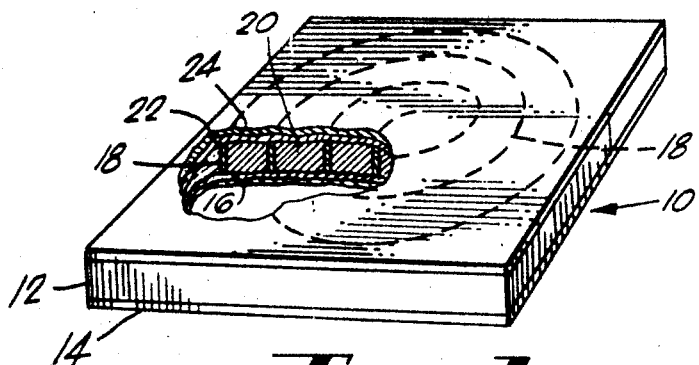
FIGURE 1 is a perspective view with parts cut away to show the pack within which the structural parts are positioned for the roll-welding and shape forming operation.
Figure 2:
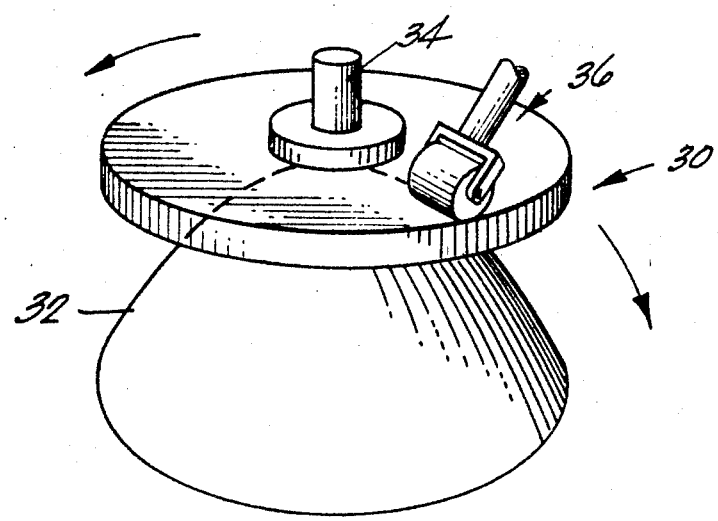
FIGURE 2 is a schematic illustration of the roll-welded pack positioned on the spin or shear forming machine.

FIGURE 1 is a perspective view of a pack 10 used in the present process. Here there is shown a yoke or frame 12 and a bottom cover sheet 14. A bottom face sheet 16 is positioned on the bottom cover sheet 14 and thereafter radial or spiral ribs 18 are positioned on the bottom face sheet. Filler material of a different metal occupies the spaces between these ribs. Thereafter face sheet 22 is positioned over the ribs and filler material and cover sheet 24 completes the pack. The cover sheets and yoke are welded together and the inside is evacuated and back-filled with an inert gas such as argon to reduce the partial pressure of contaminating gas therein. A pressure reduction to $10^{-3}$ torr is preferred. The pack is then subjected to heat to near the hot rolling temperature of the metal of the ribs and face sheets to be bonded. The preferred temperature is the $\beta$-transis temperature minus approximately 100° F. This temperature is just below that at which an undesirable phase change occurs in the crystalline structure of the material. This temperature is between 600° F. and 900° F. for aluminum alloys, 1500° F. to 1800° F. for titanium alloys and 2000° F. to 2500° F. for columbium alloys, depending upon the particular alloy used. The pack is then positioned on a spin or shear forming machine 30 as illustrated in FIGURE 2. Here a roller or mandrel 32 of appropriate configuration to serve as a male die is used. The pack 10 is positioned on top and held in position by a retaining shaft 34. A suitable roller 36 having axis control is positioned on top and moved about to urge the pack to assume the shape of the mandrel 32 over which it has been positioned. This spin or shear forming machine is of conventional design and is used for spin forming of single sheet ductile material such as aluminum, for example. Such machines have been installed and used by Lukins Steel Company in Pittsburgh and the Laddish Corporation in Milwaukee. This machine performs the elongation and required working of the metal to accomplish the roll-welding autogenous bond between the face sheets and ribs to accomplish the roll-welding and the forming at the same time. The roll time is usually about three minutes before reheating to rolling temperature is necessary. Provision also may be made for continuous heating if desired. The thickness of the pack is reduced in this operation to a ratio of about two or three to one and after the desired configuration and thickness has been achieved, the pack is then opened, the cover sheets and yoke removed. Thereafter, the filler material between the ribs of the sandwich is removed, usually by chemical means.

Figures 3, 4:
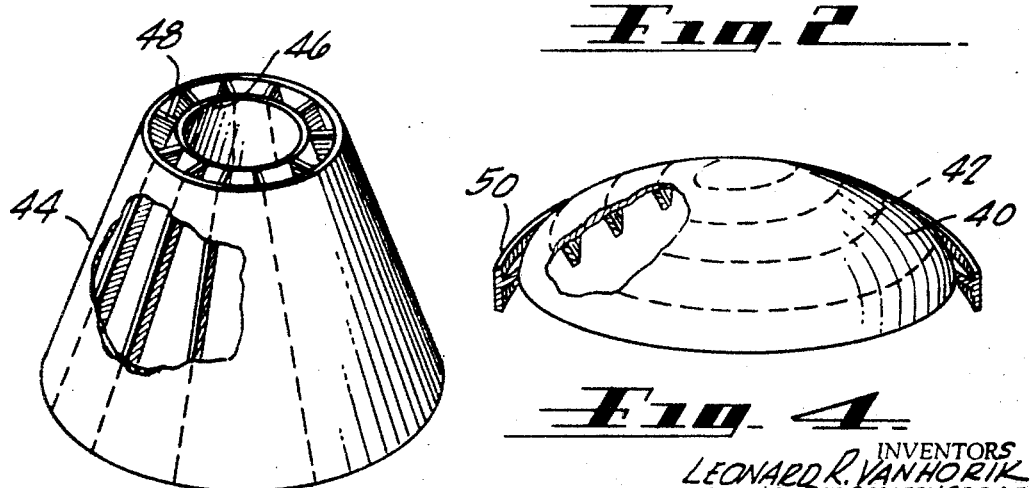
FIGURE 3 is a perspective view of a truncated cone made by the present process.
FIGURE 4 is a perspective view of a dome structure made in accordance with the present process.

The structures shown in FIGURES 3 and 4 are typical but not all inclusive of the configurations possible in the practice of the present process. In FIGURE 3, there is shown a dome consisting of an outer skin 40 with spiral stiffening ribs 42 bonded to the inside surface. FIGURE 4 shows a truncated cone consisting of an outer face sheet 44, an inner face sheet 46 with stiffening ribs 48 interconnecting them. An appropriate connecting ring 50, such as shown in copending application Ser. No. 504,876 filed Oct. 24, 1965, is shown as having been made integral with the structure formed by the present process, by placement of the necessary parts in the pack before welding. Obviously other configurations are possible using this process just described.

While the foregoing description of a preferred embodiment has been made for purposes of illustrating the principles of this invention, it is to be understood that the invention is not limited thereto and that many modifications and variations will readily occur to those skilled in the art. It is to be understood that these deviations from the preferred embodiment just described are to be considered as part of the invention as defined by the following appended claims.

We claim:
1. A roll-weld process for shape forming a body of revolution comprising the steps of:
   providing a pack having at least one face sheet therein with reinforcing ribs in abutting relationship thereto,
   filling voids within said pack with a filler material of a metal other than that of the face sheet and ribs,
   sealing said pack and reducing the pressure therein,
   heating said pack to a temperature to permit working thereof,
   rotating said pack,
   applying pressure to deform said pack to a body of revolution configuration and to a desired thickness, and to weld said ribs and sheet together,
   opening said pack, and
   removing said filler material from said sheet and ribs.

2. A roll-weld process for shape forming a body of revolution comprising the steps of:
   providing a pack having a plurality of parts in abutting relationship therein,
   filling voids within said pack with a filler material of a metal other than that of said parts,
   heating said pack to the $\beta$-transis temperature of the metal of said parts minus approximately 100° F.,
   forming said pack to a desired body of revolution configuration under sufficient pressure to weld said parts together,
   opening said pack, and
   removing said filler material from said sheet and ribs.

3. A roll-weld process for shape forming a body of revolution comprising the steps of:
   providing a pack having a plurality of parts in abutting relationship therein,
   filling voids within said pack with a filler material of a metal other than that of said parts,
   heating said pack to the $\beta$-transis temperature of a metal of said parts minus approximately 100° F.,
   placing said pack on a shear forming machine having a male die,
   rotating said die and pack,
   forming said pack over said male die under sufficient pressure to weld said parts together,
   opening said pack, and
   removing said filler material from said sheet and ribs.

4. A roll-weld process of shape forming a body of revolution comprising the steps of:
   providing a pack having at least one face sheet with reinforcing ribs in abutting relationship therein,
   filling voids within said pack with a filler material of a metal other than that of the face sheet and ribs,
   sealing said pack and evacuating to a pressure of approximately $10^{-3}$ torr,
   heating said pack to the $\beta$-transis temperature of the metal of said face sheet and ribs minus approximately 100° F.,
   placing said pack on a shear forming machine having a male die,
   forming said pack over said male die into a body of revolution configuration under sufficient pressure to weld said sheet and ribs together,
   opening said pack, and
   removing said filler material from said sheet and ribs.

5. A roll-weld process of shape forming a body of revolution comprising the steps of:
   providing a pack having at least one face sheet with reinforcing ribs and a connecting ring part in abutting relationship therein,
   filling voids within said pack with a filler material of a metal other than that of the face sheet and ribs,
   sealing said pack and evacuating to a pressure of $10^{-3}$ torr,
   heating said pack to the $\beta$-transis temperature of the metal of said face sheet and ribs minus approximately 100° F.,
   placing said pack on a shear forming machine having a male die,
   forming said pack over said male die into a body of revolution,
   opening said pack, and
   removing said filler material from said sheet, ribs and connecting ring part.

References Cited

UNITED STATES PATENTS

| | | | |
|---|---|---|---|
| 1,788,382 | 1/1931 | Cushua | 72—124 X |
| 3,072,086 | 1/1963 | Birchfield et al. | 72—124 X |
| 2,059,584 | 11/1936 | Johnson. | |
| 2,851,770 | 9/1958 | Fromson | 29—423 |
| 2,988,809 | 6/1961 | Hall | 29—423 |
| 3,044,160 | 7/1962 | Jafee. | |
| 3,123,907 | 3/1964 | Thomas | 29—481 X |
| 3,130,487 | 4/1964 | Mears | 29—424 |
| 3,186,083 | 6/1965 | Wright | 29—494 X |
| 3,195,491 | 7/1965 | Bulgrin et al. | 72—82 |
| 3,321,826 | 5/1967 | Lowy | 29—455 X |

JOHN F. CAMPBELL, Primary Examiner

J. L. CLINE, Assistant Examiner

U.S. Cl. X.R.

29—497